US012452328B2

(12) United States Patent
Kadaroesman (10) Patent No.: US 12,452,328 B2
(45) Date of Patent: Oct. 21, 2025

(54) SERVER-SIDE ADAPTIVE BITRATE STREAMING (ABR) WITH MANIFEST FILE ENCODING

(71) Applicant: Akamai Technologies, Inc., Cambridge, MA (US)

(72) Inventor: Harald Kadaroesman, New York, NY (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 18/208,442

(22) Filed: Jun. 12, 2023

(65) Prior Publication Data

US 2024/0414219 A1    Dec. 12, 2024

(51) Int. Cl.
*H04L 65/75* (2022.01)
*H04L 65/61* (2022.01)
*H04N 21/2662* (2011.01)

(52) U.S. Cl.
CPC .............. *H04L 65/75* (2022.05); *H04L 65/61* (2022.05); *H04N 21/2662* (2013.01)

(58) Field of Classification Search
CPC ..... H04L 65/75; H04L 65/61; H04L 41/0806; H04L 67/10; H04L 67/51; H04L 67/567; H04L 67/60; H04N 21/2662
See application file for complete search history.

(56) References Cited

U.S. PATENT DOCUMENTS

| 8,752,101 | B2 | 6/2014 | Onishi |
| 8,909,809 | B2 | 12/2014 | Yoshida |
| 9,532,092 | B1 | 12/2016 | Suryanarayanan et al. |

(Continued)

FOREIGN PATENT DOCUMENTS

| EP | 2785067 A1 * | 10/2014 | ......... H04N 21/2343 |
| KR | 1020150042191 A | 4/2015 | |

(Continued)

OTHER PUBLICATIONS

Bichot, et al., "How to optimize ABR video delivery with server-side quality control?" 2020 BEIT Conference Proceedings, May 2020.

(Continued)

*Primary Examiner* — Tonia L Dollinger
*Assistant Examiner* — Mehulkumar J Shah
(74) *Attorney, Agent, or Firm* — David H. Judson (57) ABSTRACT

An enhanced server-side Adaptive Bitrate Streaming (ABR) of source content. The ABR switching logic is located in association with a server, and this logic also receives telemetry data as measured by the client. The client receives a single manifest that comprises a set of encoded entries each associated with a segment of the source content and comprising a first portion encoding, as a set of options, each of the multiple bitrates, and a second portion that, for each of the multiple bitrate options, encodes a size of the segment associated therewith. In operation, the client media player makes a request for a portion of the source content, and that request includes one of the encoded entries. In response, the server-side ABR switching logic determines whether to switch delivery of the source content from an existing first bitrate to a second bitrate. If so, the requested portion is delivered to the client at the second bitrate.

19 Claims, 8 Drawing Sheets

(56) References Cited

U.S. PATENT DOCUMENTS

| | | | |
|---|---|---|---|
| 9,769,427 | B2 | 9/2017 | Taniguchi et al. |
| 10,178,043 | B1* | 1/2019 | Ganjam ............... H04L 65/764 |
| 10,305,955 | B1 | 5/2019 | Li et al. |
| 10,904,312 | B2 | 1/2021 | Law |
| 10,992,955 | B2 | 4/2021 | Braness et al. |
| 11,457,054 | B2 | 9/2022 | Soroushian et al. |
| 11,632,413 | B1 | 4/2023 | Chen |
| 2014/0317308 | A1* | 10/2014 | Zhang ................... H04L 65/80 709/231 |
| 2015/0296274 | A1* | 10/2015 | Good ................. H04N 21/8456 725/93 |
| 2016/0366202 | A1* | 12/2016 | Phillips ............ H04N 21/23439 |
| 2017/0272485 | A1 | 9/2017 | Gordon et al. |
| 2017/0353516 | A1 | 12/2017 | Gordon |
| 2019/0238390 | A1 | 8/2019 | Martin et al. |
| 2019/0306551 | A1 | 10/2019 | Arye et al. |
| 2019/0387265 | A1 | 12/2019 | Mueller et al. |
| 2020/0252663 | A1* | 8/2020 | Giladi .................. H04N 21/435 |
| 2022/0030298 | A1 | 1/2022 | Kolhekar |
| 2022/0248103 | A1* | 8/2022 | Ubertini ............. H04N 21/2662 |
| 2022/0394073 | A1 | 12/2022 | Burke et al. |
| 2022/0417610 | A1* | 12/2022 | Chandrashekar .. H04N 21/8456 |
| 2023/0026376 | A1 | 1/2023 | Martin et al. |
| 2023/0061526 | A1* | 3/2023 | Aguilar-Armijo .... H04L 65/612 |
| 2023/0069178 | A1 | 3/2023 | Sen et al. |
| 2023/0143627 | A1 | 5/2023 | Bichot et al. |
| 2023/0199267 | A1* | 6/2023 | Hyun ................. H04N 21/8456 725/116 |
| 2023/0275977 | A1* | 8/2023 | Begen ................. H04L 43/0852 709/217 |
| 2023/0336836 | A1* | 10/2023 | Phillips ................. A63F 13/493 |

FOREIGN PATENT DOCUMENTS

| | | |
|---|---|---|
| KR | 1020180077333 A | 7/2018 |
| WO | 2020138567 A1 | 7/2020 |

OTHER PUBLICATIONS

Munson, "Broadpeak takes server-side approach to ABR streaming," https://www.fiercevideo.com/tech/broadpeak-takes-server-side-approach-to-abr-streaming, Feb. 20, 2020.

"Web Application Video Ecosystem, Common Media Server Data," CTA Specification, CTA-5006, Nov. 2022.

"Web Application Video Ecosystem, Common Media Client Data," CTA Specification, CTA-5004, Feb. 2020.

International Search Report and Written Opinion, PCT/US2024/033000, Sep. 23, 2024.

* cited by examiner

```java
package abr;

import org.json.JSONObject;

public class SwitchBasedOnCMCD {
    public static int getSelectedBitrate(int segment_id, JSONObject cmcd_data) {
        // when we have CMCD data, use the entire stack
        int[] bit_rates = new int[] { 6000, 3000, 2000, 1300, 800, 600, 400, 200 };

double client_throughput = cmcd_data.optint("measured_throughput");
        double client_buffer_remaining = cmcd_data.optint("buffer_length");
        double client_requested_buffer_fill_seconds = cmcd_data.optint("object_duration")/1000.0;
        double constrained_fill_duration = client_requested_buffer_fill_seconds * .80;// constrain so we're using about 80% of the maximum throughput
        int bitrate_index = 0;
        for (; bitrate_index < bit_rates.length; bitrate_index++) {
            int candidate_bitrate = bit_rates[bitrate_index];
            double total_kbits_needed = client_requested_buffer_fill_seconds * candidate_bitrate;
            double candidate_bitrate_expected_transfer_duration = total_kbits_needed/client_throughput;
            boolean will_transfer_fast_enough = candidate_bitrate_expected_transfer_duration < constrained_fill_duration;// the download time is faster than the constrained fill duration
            boolean will_fill_before_end_of_buffer = (1.3 * candidate_bitrate_expected_transfer_duration) < client_buffer_remaining;// estimated download time plus 30% boolean accept_candidate_bitrate = will_transfer_fast_enough && will_fill_before_end_of_buffer;
            if (accept_candidate_bitrate) {
                break;
            }
        }
        if (bitrate_index == bit_rates.length) {
            System.out.println("Warning: No bitrate will satisfy selection condition, selecting the lowest one..!");
            bitrate_index--;
        } int bit_rate = bit_rates[bitrate_index];
        System.out.println("Selected:" + bit_rate + "based on CMCD data.");
        return bit_rate;
    }
}
```

FIG. 7

SERVER-SIDE ADAPTIVE BITRATE STREAMING (ABR) WITH MANIFEST FILE ENCODING

BACKGROUND

Technical Field

This application relates generally to media delivery over a network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Over the last 15 years, live streaming services have grown from novelties and experiments into profitable businesses serving an ever-growing cohort of users. Initial streaming implementations mimicked the workflows of the broadcast world, using custom servers to deliver streams via proprietary protocols. More recently, over-the-top (OTT) live streaming has become ubiquitous and enabled significant growth in volume. One primary factor in the success of OTT delivery solutions was the transition in the mid-2000s to HTTP Adaptive Streaming (HAS), which used standard HTTP servers and TCP to deliver the content, thereby allowing CDNs to leverage the full capacity of their HTTP networks to deliver streaming content instead of relying upon smaller networks of dedicated streaming servers. The two dominant HAS formats are Apple® HTTP Live Streaming (HLS), and MPEQ DASH. Since 2017, both formats can be supported in a single storage environment using the Common Media Application Format (CMAF). CMAF is a restricted version of a fragmented mp4 container and is similar to the DASH-ISO file format. CMAF is a standardized container that can hold video, audio or text data. CMAF is efficient because CMAF-wrapped media segments can be simultaneously referenced by HLS playlists ad DASH manifests. This enables content owners to package and store one set of files. The above-described live distribution side works in a similar manner with respect to "on-demand" media, which typically is stored in an origin. For on-demand delivery, the origin may be hosted in a CDN customer's own infrastructure or itself outsourced to the cloud, the CDN, or the like.

More specifically, HAS (also known as "adaptive bitrate streaming" (ABR)) is a method of video streaming over HTTP where the source content is encoded at multiple bit rates. Each of the different bit rate streams are segmented into small multi-second parts, each typically a few seconds in length. In operation, a client requesting the source content downloads a manifest file that describes the available stream segments and their respective bit rates. During stream startup, the client typically requests the segments from the lowest bit rate stream. As delivery progresses, the client may determine that the network throughput is greater than the bit rate of the downloaded segment, in which case the client requests a higher bit rate segment from the server. The client continues to request the highest bit rate segment that can be delivered efficiently, and the client can switch back to requesting a lower bit rate segment if if later determines that the network throughput has again deterioriated. In the conventional HAS solution, an adaptive bitrate (ABR) algorithm operating in the client decides which bit rate segments to download, based on the current state of the network (available bandwidth).

While client-side adaptive bitrate streaming as described above provides significant benefits to clients and content providers, the recent adoption of low-latency delivery protocols (e.g., DASH-CTE, and HLS-LL) have challenged this approach. This is because HTTP-level bandwidth estimation on the client assumes that a large segment of data is available from the server and can be sent at the link speed, an assumption that does not necessarily hold with respect to such protocols, which deliver the the content segments as micro-bursts of traffic. In low-latency protocol-based ABR delivery, the bandwidth estimation is supported server-side instead of client-side, and the ABR algorithm is executed server-side as well.

BRIEF SUMMARY

This disclosure provides for enhanced server-side Adaptive Bitrate Streaming (ABR) of source content. The source content is available for delivery at multiple bitrates, and is delivered via Hypertext Transfer Protocol (HTTP). The ABR switching logic that determines whether to switch from one bitrate to another bitrate is located in association with a server, and this logic also receives telemetry data as measured by the client (e.g., measured throughput, client buffer remaining, and so forth). In lieu of providing a client media player multiple manifests (one per available bitrate), a client instead is provided with a single manifest that comprises a set of specially-encoded entries. Each entry is associated with a segment of the source content and comprises a first portion encoding, as a set of options, each of the multiple bitrates, and a second portion that, for each of the multiple bitrate options, encodes a size of the segment associated therewith. The single manifest need only be created (from source content metadata) a single time. In operation, the client media player makes a request for a portion of the source content, and that request includes one of the encoded entries from the manifest. In response to receipt of the request and the telemetry data, the server-side ABR switching logic determines whether to switch delivery of the source content from an existing first bitrate to a second bitrate of the multiple bitrates. Upon a determination to switch delivery of the source content, the requested portion is delivered to the client at the second bitrate.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 7 depicts program code that implements the server switching algorithm.

DETAILED DESCRIPTION

Figure 1:
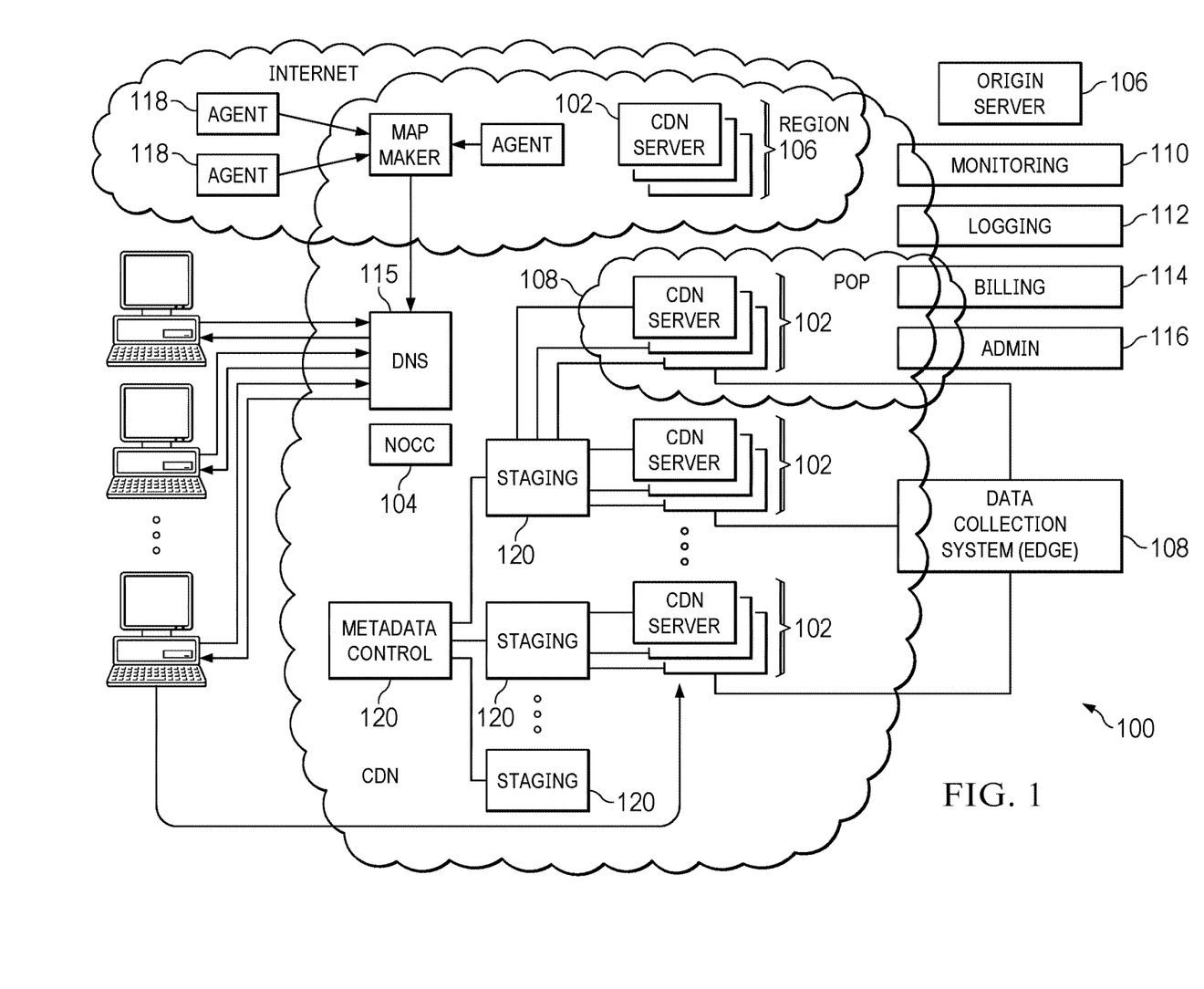
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
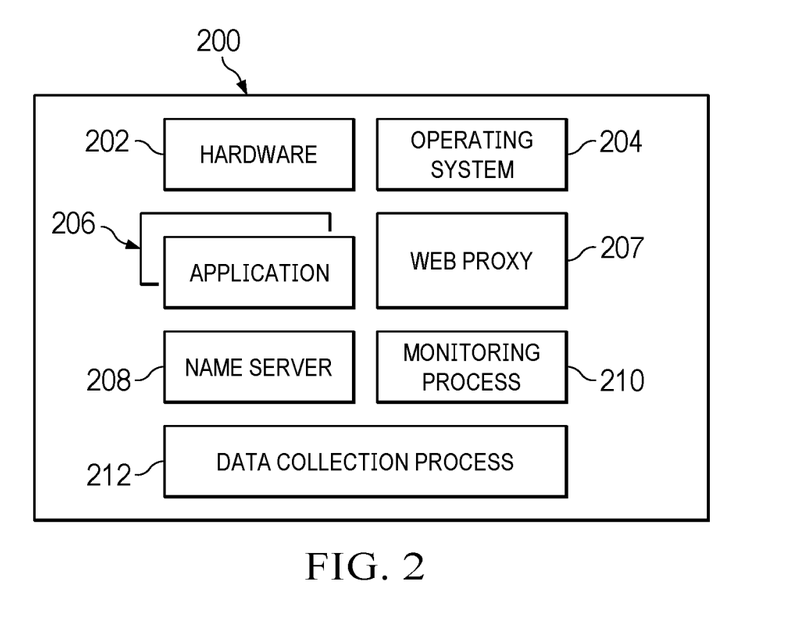
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, and as described above, the machine provides HTTP-based delivery of chunked content fragments that constitute a stream.

Figure 3:
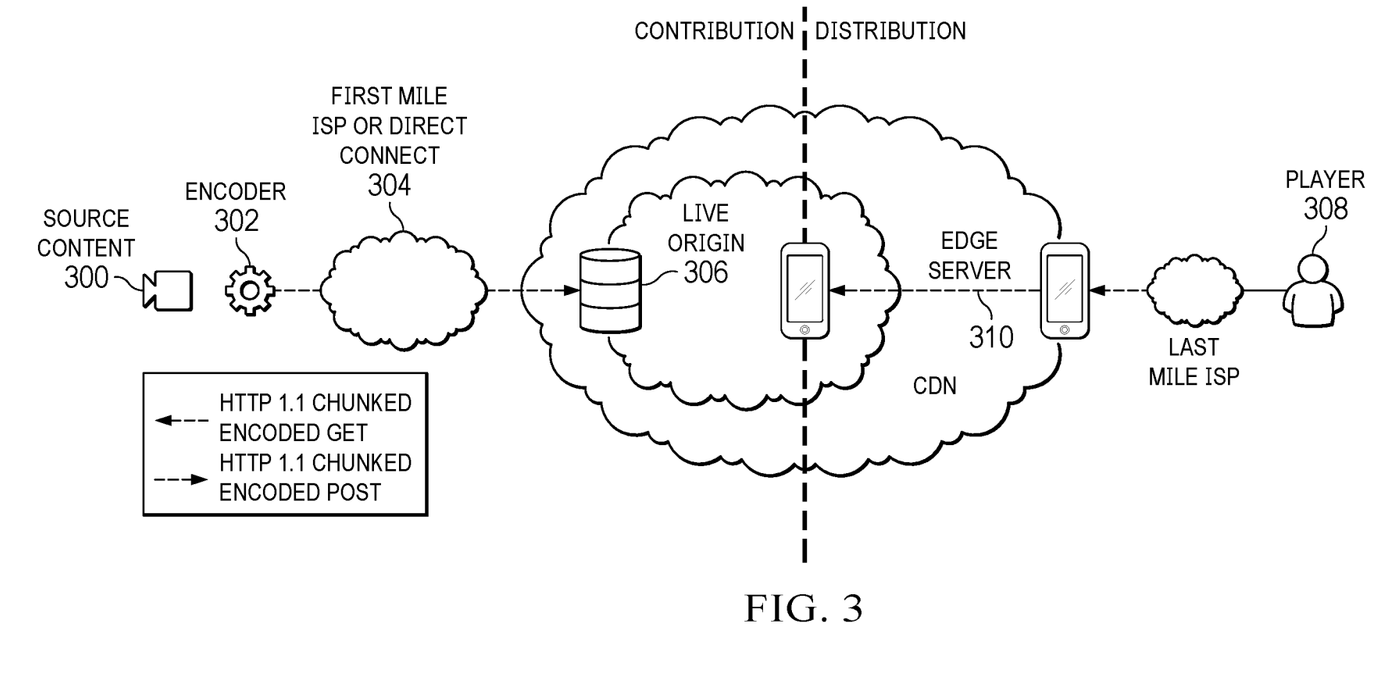
FIG. 3 is a typical ingest and CDN distribution solution.

FIG. 3 depicts a typical CMAF ingest and CDN distribution workflow for live streaming. The contribution side comprises a source camera 300, encoder 302, and a first mile ISP or direct connect network 304. After capture, the encoder pushes (via HTTP POST) the segments of the captured media to a live origin 306. A live origin has an ingest layer to accept the content, and a mid-tier layer to present the content for distribution. On the distribution side, a player 308 pulls the content chunks (via HTTP GET) from an edge server 310, which in turn sources them from the origin. Both of these halves need to work together to transfer the chunks as quickly as possible. Typically, this transfer is done using chunked transfer encoding. In operation, the encode uses HTTP 1.1 chunked transfer encoding to send an encoded CMAF chunk to the origin for redistribution. On the distribution side, and for client-side ABR, the chunk's journey is pull-based and driven by the media player. The media player reads a manifest or playlist, which describes the content, calculates a point (in the media stream) at which it wishes to start playback, and then makes a request for a segment. The player requests a segment and not a chunk, because the chunks are not addressable units typically. When asked for a segment, the CDN edge server returns all the chunks it has for that segment in sequential order using chunked transfer encoding. As more chunks arise from the origin, they are fed to the client until eventually the complete segment has been delivered. The CDN edge also caches the chunks flowing through it to build up a cached representation of the complete segment.

The above-described distribution side works in a similar manner with respect to "on-demand" media, which typically is stored in an origin. The origin may be hosted in a customer's own infrastructure or itself outsourced to the cloud, the CDN, or the like.

Generalizing, a CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Server-Side Adaptive Bitrate Streaming

Figure 4:
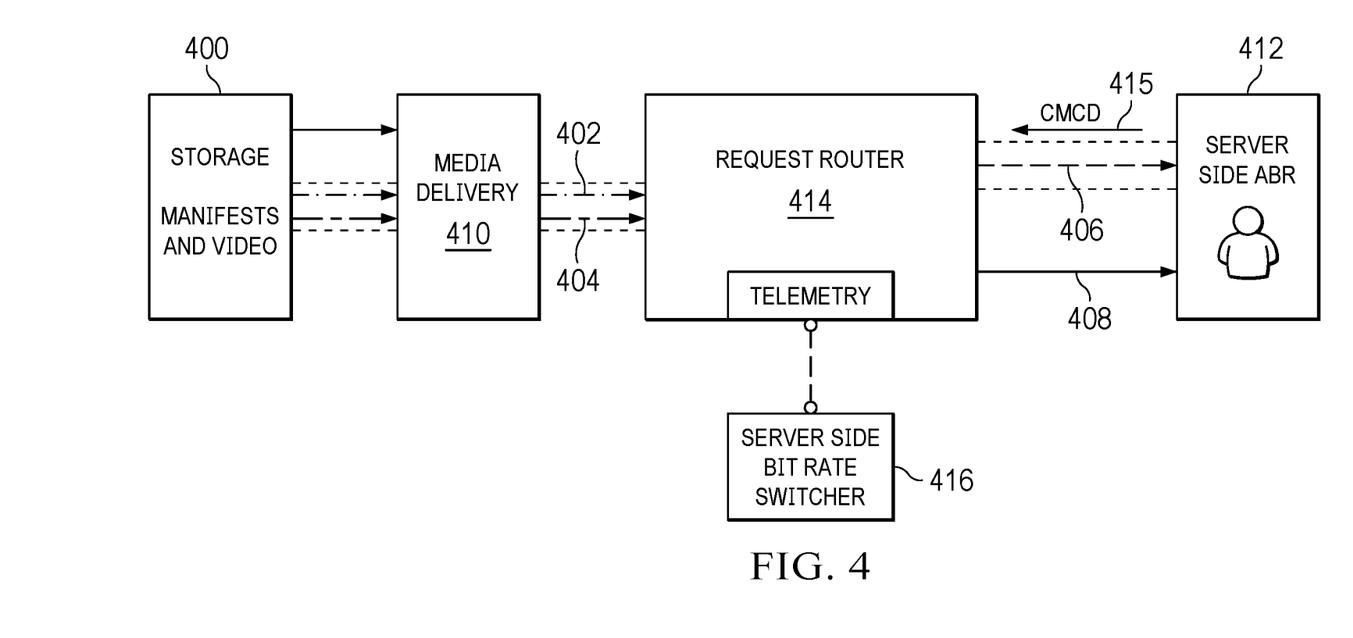
FIG. 4 depicts a server-side ABR solution in which the technique of this disclosure is implemented.

FIG. 4 depicts a representative CDN-based server-side ABR solution in which the techniques of this disclosure is implemented. The solution herein is not limited to a CDN, but this will be a typical implementation. In this architecture, the video assets and ABR manifests are hosted on a storage subsystem 400. For purposes of explanation, it is assumed that the assets are video on-demand assets. The storage subsystem may be supported in various places, e.g., in the CDN itself, in a cloud storage, in a customer origin infrastructure, or across some combination. Arrows 402 and 404 represent video data at different bitrates, and arrow 406 indicates video data at a mix of bitrates. Arrow 408 are manifest files (e.g., DASH, HLS or CMAF). Delivery is provided by a media delivery subsystem 410, which typically comprises the edge servers configured as described above with respect to FIG. 1. A representative media delivery service is Akamai® Adaptive Media Delivery (AMD). End users having media players 412 request the manifest and the associated video data. As depicted, a media player also provides client-side telemetry 415, e.g., according to the Common-Media-Client-Data (CMCD) protocol. CMCD metrics include, for example, encoded bitrate of the media object being requested, buffer length associated with the media object being requested, buffer starvation data, a content identifier uniquely identifying current content, object duration being the playback duration of the object being requested, deadline from the request time until a first sample of the segment of object needs to be available to avoid a buffer underrun or other playback issue, measured throughput between the client and the server, next object request that is the relative path of a next object to be requested, next range request if the next request is a partial object request, object type, playback rate, requested maximum throughput, streaming format, session identifier, stream type, startup state, and a top bitrate in the manifest or playlist that the client is allowed to play. The metrics are identified by CMCD keynames, such as "mtp" for measured throughput. The CMCD telemetry 415 provided by the client media player 412 is received at a request router 414, which also receives server-side telemetry, such as throughput as measured by the one or more servers being used to delivery the video assets. As also depicted in FIG. 4, and in contrast to the client-side ABR solution, here the decision logic (about when to switch bit rates) is hosted on the server-side. In this example implementation, this function is implemented as a server-side bit rate switcher 416 that will be described in more detail below. In this approach, the client-side and server-side telemetry is used to decide which bitrate to use, and the client does not necessarily know what bitrate it will receive.

To facilitate the server-side ABR solution, several techniques are implemented, as will now be described.

Figure 5A:
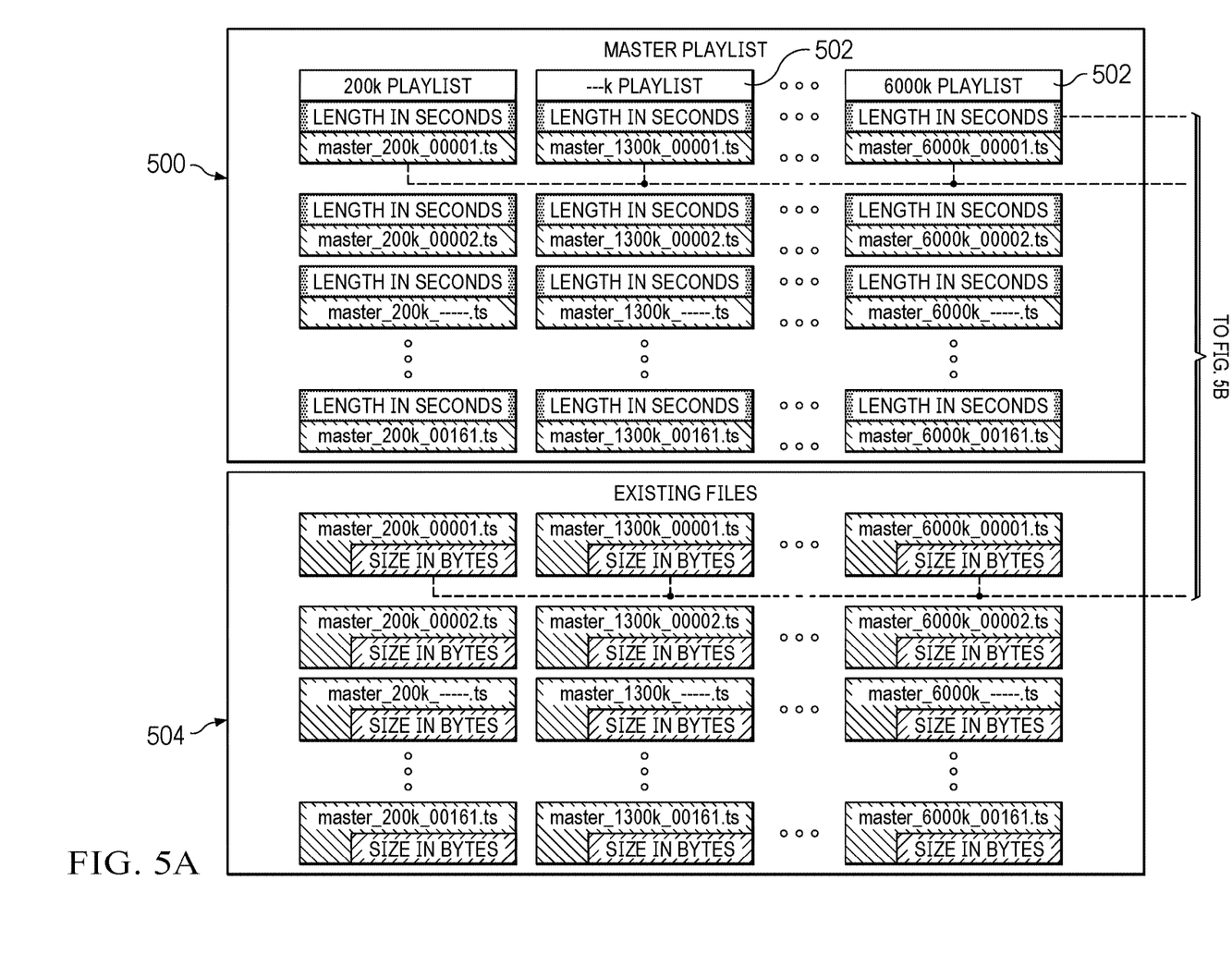
FIGS. 5A-5B depict a manifest encoding scheme of this disclosure.
Figure 5B:
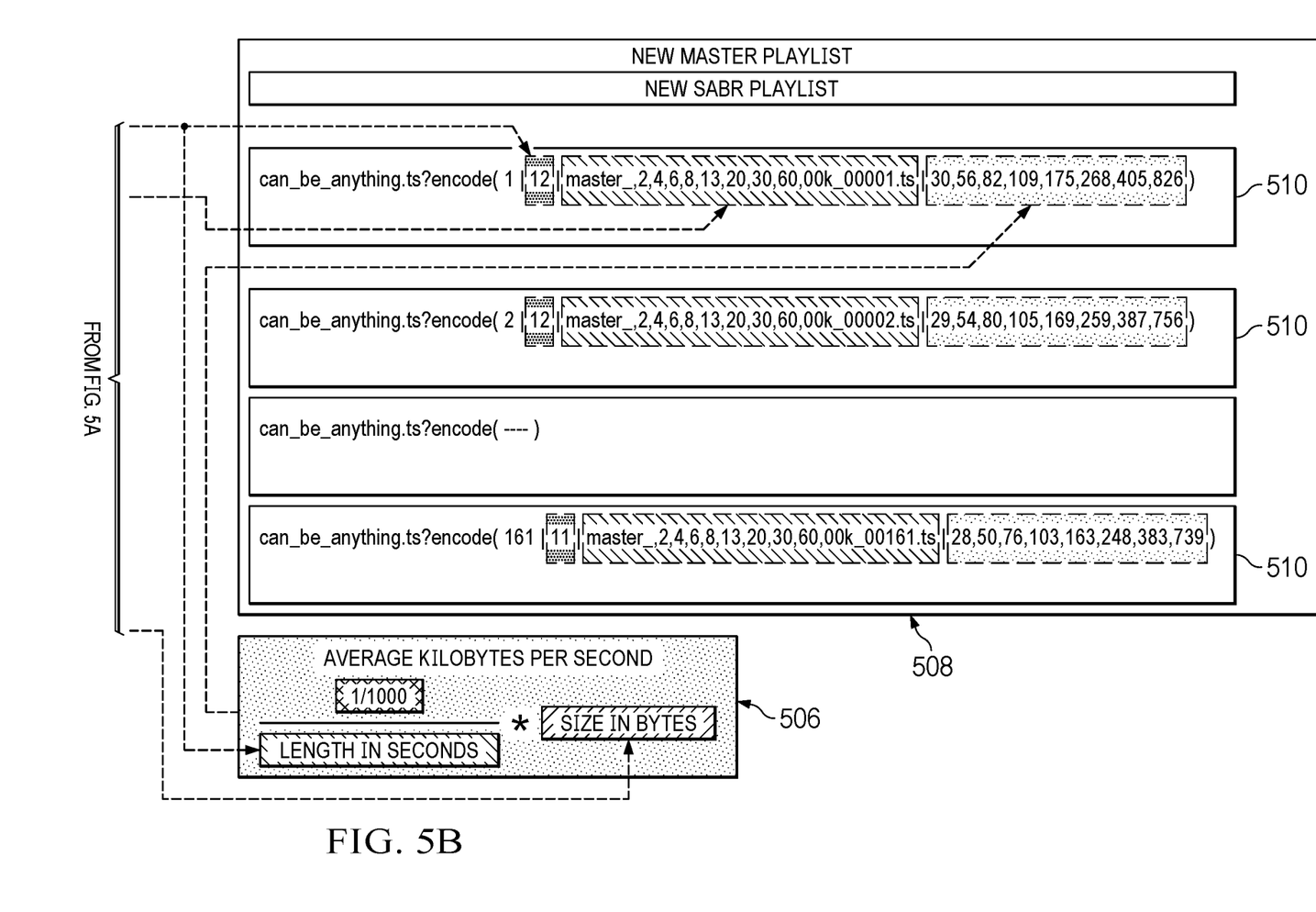

According to a first aspect, the approach herein leverages a manifest encoding scheme. This encoding scheme is described by example in FIGS. 5A-5B. As depicted, the known technique for manifest delivery and video file support is shown on the left (FIG. 5A), and the encoding scheme of this disclosure is shown on the right (FIG. 5B). In the conventional scheme, there is a master playlist 500 that includes a set of metadata for each of the set of bitrates that are supported (e.g., 200k, . . . k, . . . 600k) in this example. The individual bitrates in turn have their own playlist 502, with each separate object (e.g., master_200k_00001.ts) comprising that bitrate version identified along with its length in seconds. The actual video objects 504 that are referenced by the manifest are shown below. Each object has an associated size measured in number of bytes. For each object then, and as depicted, an average kilobytes per second 506 is computed by calculating a value={(1/1000)/(length in seconds)} * (size in bytes), such that the (size in bytes)= (average kilobytes per second) * 1000 * (length in seconds). According to the encoding scheme of this disclosure, and in lieu of the master playlist 500, a new master playlist 508 is generated. The new master playlist has a set of entries 510, each having a specific metadata format (encoding). Preferably, there are several fields in each entry: {a prefix_, a set of options, and a suffix}. The prefix is an identifier for the manifest; in this example, the prefix is "master_" corresponding to the master playlist. Following the prefix, the set of option fields comprises the various bitrate options (e.g., 6, 10, 18, 30, 48, . . . ) that are available in the master playlist. Thus, in this example, the "6" corresponds to a 600k bitrate, the "10" corresponds to a 1000k bitrate, the "18" corresponds to an 1800k bitrate, and so forth. The suffix corresponds to the filename for the file object, e.g., ". . . .00k_0011.ts." As also depicted, the entry also includes the (length in seconds), and the (average kilobytes per second) for each of bitrate options.

To provide a concrete example, and with reference to the first encoded entry 510 in the manifest depicted in FIG. 5B, the length of this particular segment in this example is 12 seconds. Here, option 6=master 600k_00001.ts, option 8=master 800k_00001.ts and option 13=master 1300k 00001.ts, . . . and the associated "average kilobytes per second" information for these options is {. . . 82, 109, 175, . . . }; accordingly, each option in the set of options in the new master playlist 508 can be correlated with its size as follows; for option 6=master 600k_00001.ts with average kilobytes per second of 82 kilobytes at 12 seconds, there is a file named: master_600k_00001.ts that is 12 * 82 kilobytes =984 kilobytes long. For option 8=master 800k_00001.ts with 109 kilobytes/second at 12 seconds, there is a file named: master 800k_00001.ts that is 12 * 109 kilobytes=1308 kilobytes long. For option 13=master 1300k 00001.ts with size 175 kilobytes/second at 12 seconds, there is a file named: master_1300k_00001.ts that is 12 * 175 kilobytes=2100 kilobytes long.

Another example is depicted in the last entry for a segment that is only 11 seconds in length. Here, option 6=master_600k_00161.ts, option 8=master_800k_00161.ts and option 20=master_2000k_00161.ts, . . . , and the associated average kilobytes per second information is {. . . 76, 103, . . . 248, . . .} for these files; accordingly, each option in the set of options in the new master playlist 508 can be correlated with its size as follows. For option 6=master_600k_00161.ts with size 76 kilobytes/second at 11 seconds, there is a file named: master_600K_000161.ts that is 11 * 76 kilobytes=836 kilobytes long. For option 8=master_800k_00161.ts with size 103 kilobytes/second at 11 seconds, there is a file named: master_800K_00161.ts that is 11 * 103 kilobytes =1133 kilobytes long. For option 20=master_2000k_00161.ts with size 248 kilobytes/second at 11 seconds, there is a file named: master_2000K_00011161.ts that is 11 * 248 kilobytes=2728 kilobytes long. The rest of the options in the set of options in the metadata entry 510 are correlated in the same way. Each such option is a candidate bitrate (candidate_bitrate) for the switching algorithm that is described below.

A similar computation is done for all options, and thus all the filenames and their sizes are known.

According to this disclosure, the new master playlist having the above-described encoding is pre-computed and is made available to the media player, which uses the playlist for generating the requests to the server. When a particular request is received at the server, it includes an entry from the new master playlist, and that entry is then used to determine a highest possible bitrate for the response, as follows.

Figure 6:
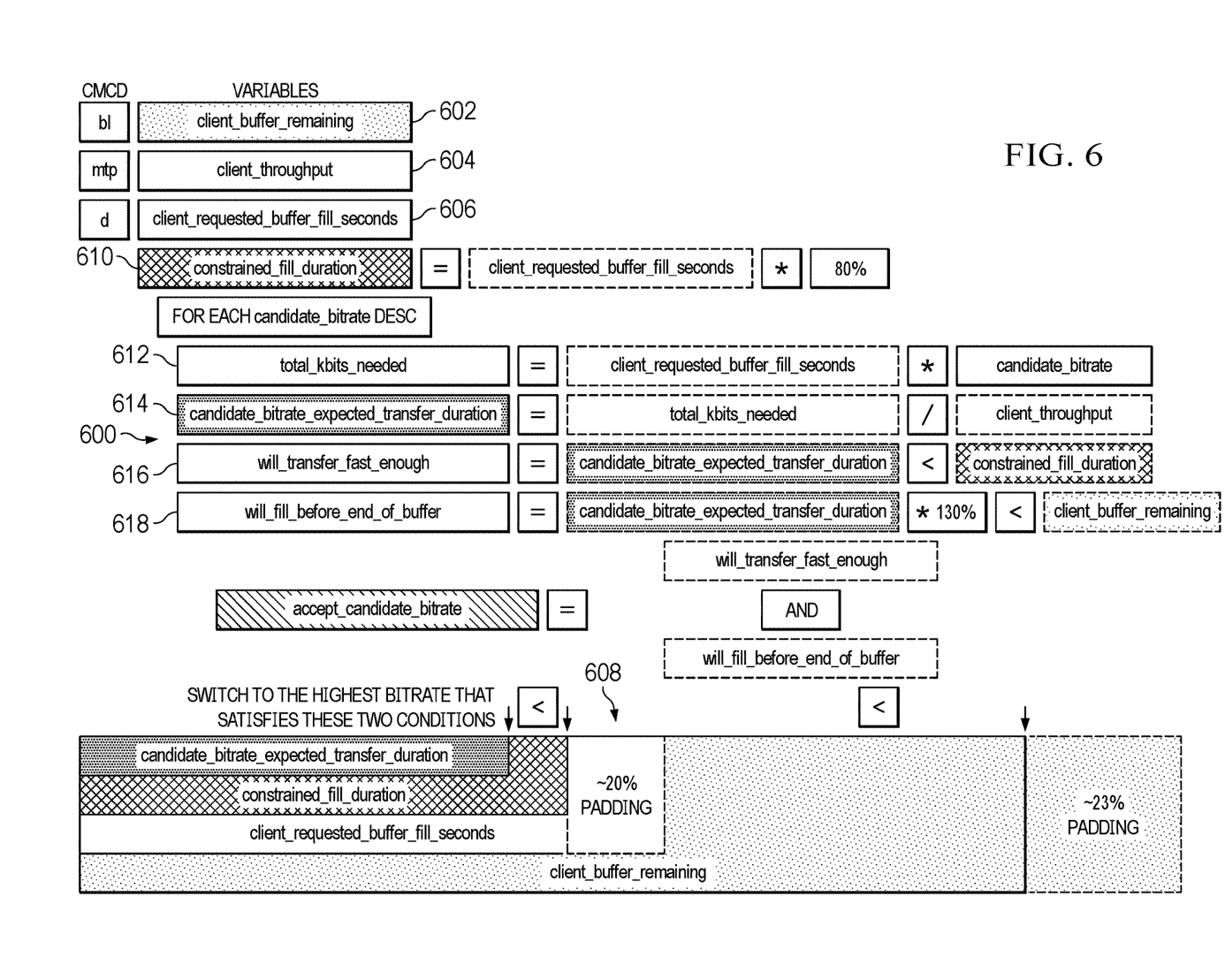
FIG. 6 depicts a CMCD-based server switching algorithm according to a further aspect of this disclosure.

FIG. 6 depicts an example implementation of a bitrate switching algorithm 600 according to this disclosure. This algorithm leverages the information that is encoded in the new master playlist (as set forth in the client request(s)), as well as information provided in the client CMCD telemetry. Typically, CMCD data is sent after a previous segment has been delivered from the server to the client. Thus, with measured throughput as the example metric, this value is the measured throughput of one or more recently delivered segment(s). As noted above, the switching may also depend on the server-side telemetry, although in this simplified example no such telemetry is used. In this example, which is not intended to be limiting, the CMCD telemetry comprises CMCD keyname bl (client_buffer_remaining as measured by the client) 602, mtp (client_throughput as measured by the client) 604, and d (client_requested_buffer_fill_seconds) 606. Preferably, and as depicted at 600, the following algorithm is then carried out on every request from a requesting client. In particular, and in response to the request, the server then computes a highest bitrate that can satisfy a pair of conditions (as reflected in a diagram 608 showing a client_buffer_remaining), namely: (1) sustain a given percent (e.g., 80%) of the client's measured throughput, and (2) at a current segment download time that is no more than a given percent (e.g., 77%) of the remaining client buffer. These percent values of course may be varied.

Continuing with this example, and as depicted in FIG. 6, the algorithm works as follows. A variable constrained_fill_duration 610 is set equal to the client_requested_buffer_fill_seconds*80%. Then, and for each candidate_bitrate in the request (corresponding to the set of options), the following computations are made. A first value total_kbits_needed 612 is set equal to the client_requested_buffer_fill_seconds*candidate_bitrate, where the client_requested_buffer_fill_seconds is obtained from the CMCD client telemetry. A second value candidate_bitrate_expected_transfer_duration 614 is set equal to the first value, total_kbits_needed, divided by client_throughput as obtained from the CMCD client telemetry. A third value will_transfer_fast_enough 616 is set equal to the second value<a constrained_fill_duration. The third value corresponds to the first of the pair of conditions that determine the bitrate to select. A fourth value will_fill_before_end_of_buffer 618 is set equal to the second value*130%, with that amount being <the client buffer remaining value as identified from the CMCD client telemetry. The fourth value corresponds to the second of the pair of conditions that determine the bitrate to select. With the above relationships in place, then the algorithm 600 then computes the highest acceptable bitrate (accept_candidate_bitrate) from the option computations as the bitrate that meets that two conditions described above, namely, will_transfer_fast_enough and will_fill_before_end_of_buffer.

Representative code for implementing the above-described server-side switching algorithm is depicted in FIG. 7 (© 2023, Akamai Technologies, Inc.). As the client sends the request and the CMCD data to the server, the server responds by adjusting the bitrate in accordance with the server switching algorithm described above. In operation, download sizes and times change according to the bitrate switches and network speed limits and, as a result, playback quality changes (with the higher/lower bitrates). For a client buffer of about thirty (30) seconds and a segment size of 12, typically there are several opportunities for the server to switch bitrate successfully without causing a rebuffer. Reducing segment size and/or increasing client playback buffer size provide more opportunities for the server to switch bitrates.

Other variants may be implemented as well. For example, when the player does not provide CMCD data (or if that data is interrupted), the bitrate may be switched every few segments. In another variant, the CMCD data includes historical client-side download performance data may be encoded and provided on a next request. This will keep the switching server stateless and provide a richer piceture of previous network conditions from the client's point of view. As a further variant, the CMCD data may include non-network related client data, e.g., resource data such as available CPU, memory, and the like.

The technique depicted provides significant advantages, namely, efficient and reliable ABR support for low latency protocols, such as DASH-CTE, and HLS-LL. The bitrate switching is based primarily on the CMCD data, and there is no requirement to know the server state. As a consequence, servier resources can be scaled up as needed (on-the-fly). Better switching decisions are enabled because the actual size of the requested object is known and taken into consideration. Instead of providing a playlist for each bitrate, there is only a single master playlist created, and a special encoding for each entry in that master playlist includes the information that the ABR switching algorithm uses (along with the CMCD-supplied client state data) to facilitate the switching logic. This single master playlist is also significantly smaller (e.g., about 50%) as compared to the aggregate size of the multiple playlists (one per bitrate) that it typically replaces. The technique also provides an alternative (and/or supplement) to conventional client-side ABR switching approaches, thereby providing further implementation options for content providers. While computation and creation of the new master playlist does incur some latency, the entries need only be computed a single time Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including collaboration technologies including videoconferencing, chat, document sharing and the like, distributed networking, Internet-based overlays, WAN-based networking, efficient utilization of Internet links, and the like, all as described above.

The request router function depicted above may be integratd into an edge server or operate separately.

The server-side bitrate switcher may be integrated into an edge server or operate separately. An example of the latter case is hosting the server-side bit rate switcher logic in a cloud environment, such as a compute node instance.

The invention claimed is:

1. A method of video streaming over Hypertext Transfer Protocol (HTTP) where source content is available for delivery at multiple bitrates, comprising:

providing a client with a single manifest for the multiple bitrates and that comprises a set of encoded entries each associated with a segment of the source content, wherein each encoded entry comprises a length of the segment specified in seconds, a set of first values representing different bitrate instances of the segment, and a set of second values associated with the set of first values, wherein a given first value of the set of first values is a compact representation of a given one of the multiple bitrates, and wherein the second value corresponding to the given first value is an average number of bytes per second of the segment;

at a server:
receiving a request for a portion of the source content from a client media player, the request having been derived from an encoded entry in the single manifest;
receiving telemetry from the client media player, the telemetry including one or more metrics as measured by the client; and
responsive to receipt of the request and the telemetry, determining whether to switch delivery of the source content from an existing first bitrate to a second bitrate of the multiple bitrates; and
upon a determination to switch delivery of the source content from the existing first bitrate to the second bitrate, deliver the portion of the source content to the client in response to the request at the second bitrate.

2. The method as described in claim 1 wherein determining whether to switch delivery includes, for each of the set of first values, computing a size of the bitrate instance by multiplying the average number of bytes per second times the length in seconds for the segment.

3. The method as described in claim 2 wherein the candidate bandwidth for each of the set of first values is computed on-the-fly in response to receiving the request.

4. The method as described in claim 1 wherein as compared to the first bitrate, the second bitrate is higher.

5. The method as described in claim 1 wherein the telemetry comprises a measured throughput as determined by the client.

6. The method as described in claim 5 wherein the delivery is switched to the second bitrate when the second bitrate is determined to be able to sustain up to a given percentage of the measured throughput.

7. The method as described in claim 1 wherein the telemetry comprises a remaining client playback buffer size as determined by the client.

8. The method as described in claim 7 wherein the delivery is switched to the second bitrate when a download time of the portion is determined to be no more than a given percentage of the remaining client playback buffer size.

9. The method as described in claim 1 wherein the telemetry comprises a measured throughput as determined by the client, and a remaining client playback buffer size as determined by the client.

10. The method as described in claim 9 wherein the delivery is switched to the second bitrate when the second bitrate is determined to be able to sustain up to a given percentage of the measured throughput and the download time of the portion is determined to be no more than a given percentage of the remaining client playback buffer size.

11. The method as described in claim 1 wherein the server is an edge server of a content delivery network.

12. The method as described in claim 1 further obtaining telemetry about the server, and incorporating the server telemetry into the determination whether to switch delivery from the existing first bitrate to the second bitrate.

13. The method as described in claim 12 wherein the server telemetry includes throughput as measured by the server.

14. The method as described in claim 1 wherein the telemetry received from the client player is encoded according to Common-Media-Client-Data (CMCD) protocol.

15. The method as described in claim 1 wherein the determining whether to switch delivery is repeated upon receipt from the client of a next request.

16. The method as described in claim 1 wherein the portion of the source content is delivered to the client over a low-latency streaming protocol.

17. The method as described in claim 16 wherein the low-latency streaming protocol is one of: DASH-CTE, and HLS-LL.

18. A method of video streaming over Hypertext Transfer Protocol (HTTP) where source content is available for delivery at multiple bitrates, comprising:

positioning an adaptive bitrate switching component in association with a server;

delivering to a client a single manifest for the multiple bitrates and that comprises a set of encoded entries each associated with a segment of the source content, wherein each encoded entry comprises a length of the segment specified in seconds, a set of first values representing different bitrate instances of the segment, and a set of second values associated with the set of first values, wherein a given first value of the set of first values is a compact representation of a given one of the multiple bitrates, and wherein the second value corresponding to the given first value is an average number of bytes per second of the segment; and responsive to receipt at the server of a request from the client that includes an encoded entry derived from the single manifest, controlling the adaptive bitrate switching component to switch to a highest available bitrate.

19. The method of video streaming as described in claim 18, further including:

receiving telemetry from the client media player, the telemetry including a measured throughput as determined by the client, and a remaining client playback buffer size as determined by the client;

wherein the highest available bitrate is that bitrate for the segment determined based on the first and second values to be able to (i) sustain up to a given percentage of the measured throughput, and (ii) a download time of the segment that is no more than a given percentage of the remaining client playback buffer size.

* * * * *